(12) United States Patent
Peek et al.

(10) Patent No.: US 9,169,395 B2
(45) Date of Patent: Oct. 27, 2015

(54) POLYCARBONATE COMPOSITION AND ARTICLES FORMED THEREFROM

(71) Applicant: SABIC Innovative Plastics IP B.V., Bergen op Zoom (NL)

(72) Inventors: Constant Peek, Vianen (NL); Robert Dirk van de Grampel, Tholen (NL); Andries J. P. van Zyl, Bergen op Zoom (NL); Adrianus A. M. Kusters, Chaam (NL)

(73) Assignee: SABIC GLOBAL TECHNOLOGIES B.V. (NL)

( * ) Notice: Subject to any disclaimer, the term of this patent is extended or adjusted under 35 U.S.C. 154(b) by 110 days.

(21) Appl. No.: 13/895,469

(22) Filed: May 16, 2013

(65) Prior Publication Data

US 2013/0309474 A1    Nov. 21, 2013

Related U.S. Application Data

(60) Provisional application No. 61/647,570, filed on May 16, 2012.

(30) Foreign Application Priority Data

May 16, 2012  (WO) ................ PCT/CN2012/075562
May 16, 2012  (WO) ................ PCT/CN2012/075575

(51) Int. Cl.
*C08L 83/10*    (2006.01)
*C08L 69/00*    (2006.01)
*C08K 5/103*    (2006.01)
*C08K 5/526*    (2006.01)
*C08G 77/448*   (2006.01)

(52) U.S. Cl.
CPC .............. *C08L 83/10* (2013.01); *C08L 69/005* (2013.01); *C08G 77/448* (2013.01); *C08K 5/103* (2013.01); *C08K 5/526* (2013.01)

(58) Field of Classification Search
None
See application file for complete search history.

(56) References Cited

U.S. PATENT DOCUMENTS

| 6,399,737 B1* | 6/2002 | Elkovitch ................... 428/411.1 |
| 2006/0002814 A1 | 1/2006 | Chatterjee et al. |
| 2007/0105994 A1 | 5/2007 | Li et al. |
| 2008/0119596 A1 | 5/2008 | Agarwal et al. |
| 2008/0230751 A1 | 9/2008 | Li et al. |
| 2010/0129649 A1 | 5/2010 | Malinoski et al. |
| 2011/0159259 A1* | 6/2011 | Park et al. ..................... 428/213 |
| 2012/0184662 A1* | 7/2012 | van der Mee et al. ........ 524/451 |

FOREIGN PATENT DOCUMENTS

| WO | 0245098 A2 | 6/2002 |
| WO | 2010006226 A1 | 1/2010 |
| WO | 2012160540 A1 | 11/2012 |
| WO | 2013170452 A1 | 11/2013 |
| WO | 2013170456 A1 | 11/2013 |

OTHER PUBLICATIONS

International Search Report and the Written Opinion of the International Searching Authority for PCT/CN2012/075562 mailed Feb. 28, 2013, 14 pages.
International Search Report and the Written Opinion of the International Searching Authority for PCT/CN2012/075575 mailed Feb. 28, 2013, 14 pages.
International Search Report of the International Searching Authority for PCT/IB2013/054018, mailed Aug. 19, 2013, 4 pages.
Written Opinion of the International Searching Authority for PCT/IB2013/054018, mailed Aug. 19, 2013, 5 pages.
Larijani, et al., The effect of carbon nanotube concentration on the physical properties of CNT-polycarbonate composites, Optoelectronics and Advanced Materials—Rapid Communications, vol. 5, No. 3, Mar. 2011, p. 252-257.

* cited by examiner

*Primary Examiner* — David Sample
*Assistant Examiner* — Donald M Flores, Jr.
(74) *Attorney, Agent, or Firm* — Cantor Colburn LLP

(57) ABSTRACT

A composition includes at least one poly(aliphatic ester)-polycarbonate copolymer, a polysiloxane-polycarbonate copolymer, and an electromagnetic shielding agent (such as metal fibers). The composition exhibits excellent impact properties and electromagnetic shielding properties when formed into an article. Another composition includes at least one poly(aliphatic ester)-polycarbonate copolymer, a polysiloxane-polycarbonate copolymer, and carbon fibers. This composition has excellent impact properties when formed into an article.

32 Claims, No Drawings

POLYCARBONATE COMPOSITION AND ARTICLES FORMED THEREFROM

CROSS REFERENCE TO RELATED APPLICATION

This application claims the benefit of U.S. Provisional Application No. 61/647,570, and claims priority to International Application PCT/CN2012/075575 and PCT/CN2012/075562, all filed May 16, 2012, all of which are incorporated by reference herein in their entirety.

BACKGROUND

The present disclosure relates generally to polycarbonate compositions that have high impact properties, good aesthetic values, and are useful in electromagnetic shielding applications. Also disclosed herein are methods for preparing and/or using the same, as well as articles comprising such polycarbonate compositions.

Polycarbonates (PC) are synthetic engineering thermoplastic polymers derived from bisphenols and phosgene, or their derivatives. They are linear polyesters of carbonic acid and may be formed from dihydroxy compounds and carbonate diesters or carbonyl halides, or by ester interchange. Polycarbonates are a useful class of polymers having many beneficial properties.

The consumer electronics market has grown significantly in recent years. Recent designs aim for slimness, with thinner walls and with wide and large display panels. Known compositions used for such mobile devices (e.g., mobile phones) may exhibit brittleness and/or cracking, unsightly surfaces, and/or poor flowability.

Due to various "critical to quality" requirements of customers, there is a need for polycarbonate compositions that have favorable flow, aesthetic, and impact properties combined with electromagnetic shielding.

BRIEF DESCRIPTION

Disclosed herein are various compositions that exhibit good impact, aesthetic, and electromagnetic shielding properties. The compositions generally include at least one poly(aliphatic ester)-polycarbonate copolymer, a polysiloxane-polycarbonate copolymer, and metal fibers. Such compositions may be used to reduce electromagnetic interference (EMI) that may result from the use of an electronic device. It is contemplated that these compositions may be used to make articles useful as, for example, a housing for an electronic device.

Disclosed in some embodiments is a composition comprising: a first poly(aliphatic ester)-polycarbonate copolymer having a weight average molecular weight of from about 15,000 to about 40,000 Da; a polysiloxane-polycarbonate copolymer; and an electromagnetic shielding agent; wherein the composition exhibits a notched Izod impact strength measured according to ASTM D256 of at least about 110 J/m; and a gloss measured according to ASTM D2457 (at 20°) of at least about 90.

The composition may comprise from about 5 to about 20 wt % of the electromagnetic shielding agent. The electromagnetic shielding agent may be metal fibers, such as stainless steel fibers. The composition may exhibit a shielding effectiveness measured according to ASTM D4935 of at least 40 decibels.

The aliphatic ester may be derived from an aliphatic dicarboxylic acid that has a total of from 8 to 12 carbon atoms. An ester repeat unit of the first poly(aliphatic ester)-polycarbonate copolymer may be derived from sebacic acid.

The composition may comprise up to about 85 wt % of the first poly(aliphatic ester)-polycarbonate copolymer.

In some embodiments, the first poly(aliphatic ester)-polycarbonate copolymer contains from about 2 to about 13 mol % of aliphatic ester units. The first poly(aliphatic ester)-polycarbonate copolymer may also contain from about 87 to about 98 mol % of carbonate units derived from bisphenol-A. The aliphatic ester units may be derived from sebacic acid.

The composition may further comprise a second poly(aliphatic ester)-polycarbonate copolymer; wherein a weight average molecular weight of the second poly(aliphatic ester)-polycarbonate copolymer is greater than the weight average molecular weight of the first poly(aliphatic ester)-polycarbonate copolymer. The weight ratio of the first poly(aliphatic ester)-polycarbonate copolymer to the second poly(aliphatic ester)-polycarbonate copolymer may be from about 1:4 to about 5:2.

In embodiments, the first poly(aliphatic ester)-polycarbonate copolymer has a weight average molecular weight of from about 15,000 to about 25,000 Da, and the second poly(aliphatic ester)-polycarbonate copolymer has a weight average molecular weight of from about 30,000 to about 40,000 Da. The composition may comprise from about 10 to about 55 wt % of the first poly(aliphatic ester)-polycarbonate copolymer. The composition may comprise from about 5 to about 40 wt % of the second poly(aliphatic ester)-polycarbonate copolymer.

The composition may comprise up to about 70 wt % of the polysiloxane-polycarbonate copolymer. A siloxane block chain length of the polysiloxane-polycarbonate copolymer may be from about 30 to about 100, such as from about 35 to about 55. The polysiloxane-polycarbonate copolymer may have a siloxane block content of from about 15 wt % to about 25 wt %. Alternatively, the composition may have a siloxane block content of from about 0.5 to about 5 wt %, including from about 0.9 to about 4.0 wt %, or from about 2.0 to about 3.0 wt %. Alternatively, the composition may have a total softblock content of less than about 3.5 wt %. In other embodiments, the composition comprises from about 0.5 wt % to about 6 wt % of siloxane originating from the polysiloxane-polycarbonate copolymer.

In some embodiments, the composition may also exhibit a flexural modulus measured according to ISO 178 of at least 2000 MPa. In other embodiments, the composition also exhibits a notched Izod impact strength measured according to ASTM D 256 of at least about 130 J/m. In yet others, the composition exhibits a gloss (at 20°) of at least about 92.

In particular embodiments, the composition exhibits a notched Izod impact strength measured according to ASTM D 256 of at least about 140 J/m; a gloss measured according to ASTM D2457 (at 20°) of at least about 92; and a shielding effectiveness measured according to ASTM D4935 of at least about 30 decibels.

In yet other embodiments, the composition exhibits a gloss measured according to ASTM D2457 (at 60°) of at least about 98.

Also disclosed is an article having a wall with a thickness of at least 0.3 mm and less than 0.8 mm, the article being made from a composition comprising: a first poly(aliphatic ester)-polycarbonate copolymer having a weight average molecular weight of from about 15,000 to about 40,000 Da; a polysiloxane-polycarbonate copolymer; and an electromagnetic shielding agent; wherein the composition exhibits a notched Izod impact strength measured according to ASTM D 256 of at least about 110 J/m; and a gloss measured according to ASTM D2457 (at 20°) of at least about 90.

The article may be a part of a cellphone, a MP3 player, a computer, a laptop, a camera, a video recorder, an electronic tablet, a pager, a hand receiver, a video game, a calculator, a wireless car entry device, an automotive part, a filter housing, a luggage cart, an office chair, a kitchen appliance, an electrical housing, an electrical connector, a lighting fixture, a light emitting diode, an electrical part, or a telecommunications part.

Also disclosed in embodiments is a composition comprising: a first poly(aliphatic ester)-polycarbonate copolymer having a weight average molecular weight of from about 15,000 to about 25,000 Da; a second poly(aliphatic ester)-polycarbonate copolymer having a weight average molecular weight of from about 30,000 to about 40,000 Da; a polysiloxane-polycarbonate copolymer; and metal fibers; wherein the composition exhibits a notched Izod impact strength measured according to ASTM D 256 of at least about 110 J/m; and a gloss measured according to ASTM D2457 (at 20°) of at least about 90.

More specifically disclosed in various embodiments is a composition comprising: a first poly(aliphatic ester)-polycarbonate copolymer having a weight average molecular weight of from about 15,000 to about 40,000 Da; a polysiloxane-polycarbonate copolymer; and an electromagnetic shielding agent; wherein the composition exhibits a notched Izod impact strength measured according to ASTM D 256 of at least about 110 J/m; a gloss measured according to ASTM D2457 (at 20°) of at least about 90; and a shielding effectiveness measured according to ASTM D4935 of at least about 30 decibels.

Disclosed in other embodiments is a second set of polycarbonate compositions comprising: a first poly(aliphatic ester)-polycarbonate copolymer having a weight average molecular weight of from about 15,000 to about 40,000 Da; a polysiloxane-polycarbonate copolymer; and carbon fibers; wherein the composition exhibits a notched Izod impact strength measured according to ISO 180 (23° C., 3 mm) of at least 9.5 kJ/m$^2$; and a multiaxial impact strength (MAI) measured according to ASTM D3763 (23° C.) of at least about 13 J.

The composition may comprise up to about 85 wt % of the first poly(aliphatic ester)-polycarbonate copolymer.

The composition may also further comprise a second poly(aliphatic ester)-polycarbonate copolymer; wherein a weight average molecular weight of the second poly(aliphatic ester)-polycarbonate copolymer is greater than the weight average molecular weight of the first poly(aliphatic ester)-polycarbonate copolymer.

The weight ratio of the first poly(aliphatic ester)-polycarbonate copolymer to the second poly(aliphatic ester)-polycarbonate copolymer may be from about 1:4 to about 5:2. In some embodiments, the first poly(aliphatic ester)-polycarbonate copolymer has a weight average molecular weight of from about 15,000 to about 25,000 Da, and the second poly(aliphatic ester)-polycarbonate copolymer has a weight average molecular weight of from about 30,000 to about 40,000 Da. The composition may comprise from about 5 to about 50 wt % of the first poly(aliphatic ester)-polycarbonate copolymer. The composition may comprise from about 5 to about 30 wt % of the second poly(aliphatic ester)-polycarbonate copolymer.

The composition may comprise up to about 70 wt % of the polysiloxane-polycarbonate copolymer.

In some embodiments, the composition exhibits a notched Izod impact strength measured according to ISO 180 (23° C., 3 mm) of at least about 11 kJ/m$^2$; and a multiaxial impact strength (MAI) measured according to ASTM D3763 (23° C.) of at least about 14 J.

In particular embodiments, the second set of compositions exhibits a notched Izod impact strength measured according to ISO 180 (23° C., 3 mm) of at least about 9.5 kJ/m$^2$; a multiaxial impact strength (MAI) measured according to ASTM D3763 (23° C.) of at least about 13 J; a flexural modulus of at least about 9000 MPa; and a gloss measured according to ASTM D2457 (at 20°) of at least about 10.

In other embodiments, the second set of compositions exhibits a notched Izod impact strength measured according to ISO 180 (23° C., 3 mm) of at least about 9.5 kJ/m$^2$; a multiaxial impact strength (MAI) measured according to ASTM D3763 (23° C.) of at least about 13 J; a flexural modulus of at least about 10,000 MPa; and a gloss measured according to ASTM D2457 (at 20°) of at least about 15.

Also disclosed is an article made from the second set of polycarbonate compositions. The article may have a wall with a thickness of at least 0.3 mm and less than 0.8 mm.

These and other non-limiting characteristics are more particularly described below.

DETAILED DESCRIPTION

The present disclosure may be understood more readily by reference to the following detailed description of desired embodiments and the examples included therein. In the following specification and the claims that follow, reference will be made to a number of terms that shall be defined to have the following meanings.

The singular forms "a," "an," and "the" include plural referents unless the context clearly dictates otherwise.

As used in the specification and in the claims, the term "comprising" may include the embodiments "consisting of" and "consisting essentially of."

Numerical values in the specification and claims of this application, particularly as they relate to polymers or polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from about 2 grams to about 10 grams" is inclusive of the endpoints, 2 grams and 10 grams, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4."

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, the aldehyde group —CHO is attached through the carbon of the carbonyl group.

The term "aliphatic" refers to a linear or branched array of atoms that is not cyclic and has a valence of at least one. Aliphatic groups are defined to comprise at least one carbon atom. The array of atoms may include heteroatoms such as nitrogen, sulfur, silicon, selenium, and oxygen in the backbone or may be composed exclusively of carbon and hydrogen. Aliphatic groups may be substituted or unsubstituted. Exemplary aliphatic groups include, but are not limited to, methyl, ethyl, isopropyl, isobutyl, hydroxymethyl (—CH$_2$OH), mercaptomethyl (—CH$_2$SH), methoxy, methoxycarbonyl (CH$_3$OCO—), nitromethyl (—CH$_2$NO$_2$), and thiocarbonyl.

The term "alkyl" refers to a linear or branched array of atoms that is composed exclusively of carbon and hydrogen. The array of atoms may include single bonds, double bonds, or triple bonds (typically referred to as alkane, alkene, or alkyne). Alkyl groups may be substituted (i.e., one or more hydrogen atoms is replaced) or unsubstituted. Exemplary alkyl groups include, but are not limited to, methyl, ethyl, and isopropyl. It should be noted that alkyl is a subset of aliphatic.

The term "aromatic" refers to an array of atoms having a valence of at least one and comprising at least one aromatic group. The array of atoms may include heteroatoms such as nitrogen, sulfur, selenium, silicon, and oxygen, or may be composed exclusively of carbon and hydrogen. Aromatic groups may be substituted or unsubstituted. Exemplary aromatic groups include, but are not limited to, phenyl, pyridyl, furanyl, thienyl, naphthyl, and biphenyl.

The term "aryl" refers to an aromatic radical composed entirely of carbon atoms and hydrogen atoms. When aryl is described in connection with a numerical range of carbon atoms, it should not be construed as including substituted aromatic radicals. For example, the phrase "aryl containing from 6 to about 10 carbon atoms" should be construed as referring to a phenyl group (6 carbon atoms) or a naphthyl group (10 carbon atoms) only, and should not be construed as including a methylphenyl group (7 carbon atoms). It should be noted that aryl is a subset of aromatic.

The term "cycloaliphatic" refers to an array of atoms which is cyclic but which is not aromatic. The cycloaliphatic group may include heteroatoms such as nitrogen, sulfur, selenium, silicon, and oxygen in the ring, or may be composed exclusively of carbon and hydrogen. A cycloaliphatic group may comprise one or more noncyclic components. For example, a cyclohexylmethyl group (C$_6$H$_{11}$CH$_2$—) is a cycloaliphatic functionality, which comprises a cyclohexyl ring (the array of atoms which is cyclic but which is not aromatic) and a methylene group (the noncyclic component). Cycloaliphatic groups may be substituted or unsubstituted. Exemplary cycloaliphatic groups include, but are not limited to, cyclopropyl, cyclobutyl, 1,1,4,4-tetramethylcyclobutyl, piperidinyl, and 2,2,6,6-tetramethylpiperydinyl.

The term "cycloalkyl" refers to an array of atoms which is cyclic but is not aromatic, and which is composed exclusively of carbon and hydrogen. Cycloalkyl groups may be substituted or unsubstituted. It should be noted that cycloalkyl is a subset of cycloaliphatic.

In the definitions above, the term "substituted" refers to at least one hydrogen atom on the named radical being substituted with another functional group, such as alkyl, halogen, —OH, —CN, —NO$_2$, —COOH, etc.

For thin yet large part designs of mobile devices, a material is desired that may provide electromagnetic shielding, as electromagnetic interference (EMI) from such devices may cause interruption and failure in other electrical devices. The EMI effect, for example, is one reason why airlines typically require electronic devices to be turned off during takeoff and landing. High impact resistance is also desirable. Another concern is related to aesthetics; molded parts with filler protruding from the surface are unsightly.

The present disclosure generally relates to polycarbonate compositions which exhibit a balance of favorable impact properties, good aesthetics, and have high electromagnetic shielding effectiveness. The polycarbonate compositions comprise (A) at least one poly(aliphatic ester)-polycarbonate copolymer, (B) a polysiloxane-polycarbonate copolymer, and (C) an electromagnetic shielding agent. The synergistic combination of these ingredients provide excellent impact strength, surface aesthetics, and electromagnetic shielding.

As used herein, the terms "polycarbonate" and "polycarbonate polymer" mean compositions having repeating structural carbonate units of the formula (1):

in which at least about 60 percent of the total number of R$^1$ groups are aromatic organic radicals and the balance thereof are aliphatic, alicyclic, or aromatic radicals. An ester unit (—COO—) is not considered a carbonate unit, and a carbonate unit is not considered an ester unit. In some embodiments, each R$^1$ is an aromatic organic radical, for example a radical of the formula (2):

$$-A^1-Y^1-A^2 \qquad (2)$$

wherein each of A$^1$ and A$^2$ is a monocyclic divalent aryl radical and Y$^1$ is a bridging radical having one or two atoms that separate A$^1$ from A$^2$. In an exemplary embodiment, one atom separates A$^1$ from A$^2$. Illustrative non-limiting examples of radicals of this type are —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical Y$^1$ may be a hydrocarbon group or a saturated hydrocarbon group such as methylene, cyclohexylidene, or isopropylidene.

Polycarbonates may be produced by the interfacial reaction of dihydroxy compounds having the formula HO—R$^1$—OH, wherein R$^1$ is as defined above. Dihydroxy compounds suitable in an interfacial reaction include the dihydroxy compounds of formula (A) as well as dihydroxy compounds of formula (3)

$$HO-A^1-Y^1-A^2-OH \qquad (3)$$

wherein Y$^1$, A$^1$, and A$^2$ are as described above. Also included are bisphenol compounds of general formula (4):

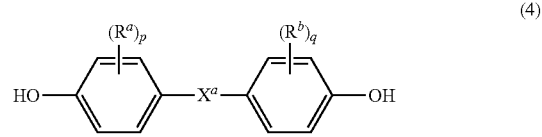

wherein R$^a$ and R$^b$ each represent a halogen atom or a monovalent hydrocarbon group, for example a C$_1$-C$_3$ alkyl group, and may be the same or different; p and q are each independently integers of 0 to 4; and $X^a$ represents one of the groups of formula (5):

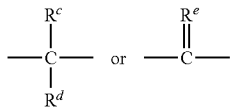

wherein $R^c$ and $R^d$ each independently represent a hydrogen atom or a monovalent linear or cyclic hydrocarbon group and $R^e$ is a divalent hydrocarbon group.

Specific examples of the types of bisphenol compounds that may be represented by formula (3) include 1,1-bis(4-hydroxyphenyl) methane, 1,1-bis(4-hydroxyphenyl)ethane, 2,2-bis(4-hydroxyphenyl) propane (hereinafter "bisphenol-A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, and 1,1-bis(4-hydroxy-t-butylphenyl) propane. Combinations comprising at least one of the foregoing dihydroxy compounds may also be used.

Other useful dihydroxy compounds include aromatic dihydroxy compounds of formula (6):

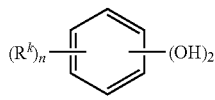

wherein each $R^k$ is independently a $C_1$-$C_{10}$ hydrocarbon group and n is 0 to 4. The halogen is usually bromine. Examples of compounds that may be represented by formula (6) include resorcinol, substituted resorcinol compounds such as 5-methyl resorcinol, 5-phenyl resorcinol, 5-cumyl resorcinol, or the like; catechol; hydroquinone; substituted hydroquinones such as 2-methyl hydroquinone, 2-t-butyl hydroquinone, 2-phenyl hydroquinone, 2-cumyl hydroquinone, 2,3,5,6-tetramethyl hydroquinone, or the like; or combinations comprising at least one of the foregoing compounds.

Polycarbonates may be branched. The branched polycarbonates may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane (THPE), isatin-bis-phenol, tris-phenol TC (1,3,5-tris ((p-hydroxyphenyl)isopropyl)benzene), tris-phenol PA (4(4 (1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents may be added at a level of about 0.05 wt % to about 2.0 wt %.

In specific embodiments, the dihydroxy compound used to form the polycarbonate has the structure of formula (4a):

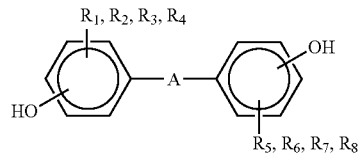

wherein $R_1$ through $R_8$ are each independently selected from hydrogen, nitro, cyano, $C_1$-$C_{20}$ alkyl, $C_4$-$C_{20}$ cycloalkyl, and $C_6$-$C_{20}$ aryl; and A is selected from a bond, —O—, —S—, —SO$_2$—, $C_1$-$C_{12}$ alkyl, $C_6$-$C_{20}$ aromatic, and $C_6$-$C_{20}$ cycloaliphatic.

In specific embodiments, the dihydroxy compound of Formula (4a) is 2,2-bis(4-hydroxyphenyl) propane (i.e., bisphenol-A or BPA). Other illustrative compounds of Formula (I) include: 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 1,1-bis(4-hydroxyphenyl)cyclohexane; 4,4'-dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-dihydroxydiphenylether; 4,4'-dihydroxydiphenylthioether; and 1,3-bis(2-(4-hydroxyphenyl)-2-propyl)benzene.

The polycarbonate compositions of this disclosure contain at least two polycarbonate copolymers. First, the polycarbonate compositions contain at least one poly(aliphatic ester)-polycarbonate copolymer (A). The poly(aliphatic ester)-polycarbonate copolymer is made up of a combination of carbonate units and aliphatic ester units. The molar ratio of ester units to carbonate units may vary widely, for example from about 1:99 to about 99:1, or more specifically from about 25:75 to about 75:25, depending on the desired properties of the final compositions.

The ester unit may have the structure of formula (7):

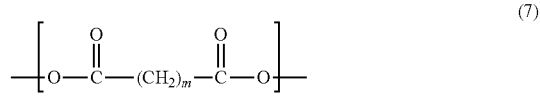

wherein m is from about 4 to about 18. In some embodiments, m is from 8 to 10. The ester units may be derived from a $C_6$-$C_{20}$ aliphatic dicarboxylic acid (which includes the terminal carboxylate groups) or a reactive derivative thereof, including a $C_8$-$C_{12}$ aliphatic dicarboxylic acid. In some embodiments, the terminal carboxylate groups are derived from the corresponding dicarboxylic acid or reactive derivative thereof, such as the acid halide (specifically, the acid chloride), an ester, or the like. Exemplary dicarboxylic acids (from which the corresponding acid chlorides may be derived) include $C_6$ dicarboxylic acids such as hexanedioic acid (also referred to as adipic acid); $C_{10}$ dicarboxylic acids such as decanedioic acid (also referred to as sebacic acid); and alpha, omega $C_{12}$ dicarboxylic acids such as dodecanedioic acid (sometimes abbreviated as DDDA). It will be appreciated that the aliphatic dicarboxylic acid is not limited to these exemplary carbon chain lengths, and that other chain lengths within the $C_6$-$C_{20}$ range may be used.

A specific embodiment of the poly(aliphatic ester)-polycarbonate copolymer having ester units comprising a straight chain methylene group and a polycarbonate group is shown in formula (8):

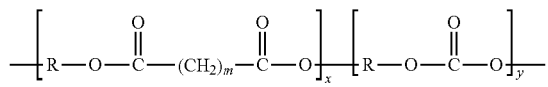

(8)

where m is about 3 to about 18; x and y represent average molar percentages of the aliphatic ester units and the carbonate units in the copolymer. The average molar percentage ratio x:y may be from about 99:1 to about 1:99, including from about 13:87 to about 2:98, or from about 9:91 to about 2:98 or from about 8:92 to about 13:87. Each R may be independently derived from a dihydroxy compound. In a specific exemplary embodiment, a useful poly(aliphatic ester)-polycarbonate copolymer comprises sebacic acid ester units (formula (7), where m is 8), and bisphenol A carbonate units, having, for example an average molar ratio of x:y of about 2:98 to about 8:92, for example 6:94). Such poly(aliphatic ester)-polycarbonate copolymers are commercially available as LEXAN HFD copolymers (LEXAN is a trademark of SABIC IP B. V.).

In some embodiments, the poly(aliphatic ester) polycarbonate copolymer may have a weight average molecular weight of from about 15,000 to about 40,000 Dalton (Da), including from about 20,000 to about 38,000 Da (measured by GPC based on BPA polycarbonate standards). The polycarbonate compositions may include from about 20 wt % to about 85 wt % of the poly(aliphatic ester)-polycarbonate copolymer.

In some embodiments of the present disclosure, the polycarbonate composition includes two poly(aliphatic ester)-polycarbonate copolymers, i.e., a first poly(aliphatic ester)-polycarbonate copolymer (A1) and a second poly(aliphatic ester)-polycarbonate copolymer (A2). The two poly(aliphatic ester)-polycarbonate copolymers may have the same or different ester unit and the same or different carbonate unit.

The first poly(aliphatic ester)-polycarbonate copolymer has a lower weight average molecular weight than the second poly(aliphatic ester)-polycarbonate copolymer. The first poly(aliphatic ester)-polycarbonate copolymer may have a weight average molecular weight of from about 15,000 to about 25,000 Da, including from about 20,000 to about 22,000 Da (measured by GPC based on BPA polycarbonate standards). Referring to Formula (III), the first poly(aliphatic ester)-polycarbonate copolymer may have an average molar percentage ratio x:y of from about 7:93 to about 13:87. The second poly(aliphatic ester)-polycarbonate copolymer may have a weight average molecular weight of about 30,000 to about 40,000 Da, including from about 35,000 to about 38,000 Da (measured by GPC based on BPA polycarbonate standards). Referring to Formula (III), the second poly(aliphatic ester)-polycarbonate copolymer may have an average molar percentage ratio x:y of from about 4:96 to about 7:93. In embodiments, the weight ratio of the first poly(aliphatic ester)-polycarbonate copolymer to the second poly(aliphatic ester)-polycarbonate copolymer may be from about 1:4 to about 5:2 (i.e., from about 0.25 to about 2.5). Note the weight ratio described here is the ratio of the amounts of the two copolymers in the composition, not the ratio of the molecular weights of the two copolymers. The weight ratio between the two poly(aliphatic ester)-polycarbonate copolymers will affect the flow properties, ductility, and surface aesthetics of the final composition. Some embodiments contain more of the higher Mw copolymer than the lower Mw copolymer, i.e., the ratio of the second poly(aliphatic ester)-polycarbonate copolymer to the first poly(aliphatic ester)-polycarbonate copolymer is from 0:1 to about 1:1. Other embodiments contain more of the lower Mw copolymer than the higher Mw copolymer, i.e., the ratio of the second poly(aliphatic ester)-polycarbonate copolymer to the first poly(aliphatic ester)-polycarbonate copolymer is from about 1:1 to about 5:2. The compositions may include from about 20 to about 85 wt % of the first poly(aliphatic ester)-polycarbonate copolymer (i.e., the lower Mw copolymer) and the second poly(aliphatic ester)-polycarbonate copolymer (i.e., the higher Mw copolymer) combined. The composition may contain from about 10 to about 55 wt % of the first poly(aliphatic ester)-polycarbonate copolymer. The composition may contain from about 5 to about 40 wt % of the second poly(aliphatic ester)-polycarbonate copolymer.

The polycarbonate compositions also contain a polysiloxane-polycarbonate copolymer (B). This copolymer comprises polycarbonate blocks and polydiorganosiloxane blocks. The polycarbonate blocks in the copolymer comprise repeating structural units of formula (1) as described above, for example wherein $R^1$ is of formula (2) as described above. These units may be derived from reaction of dihydroxy compounds of formula (3) as described above.

The polydiorganosiloxane blocks comprise repeating structural units of formula (9) (sometimes referred to herein as 'siloxane'):

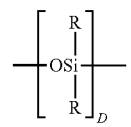

(9)

wherein each occurrence of R is same or different, and is a $C_{1-13}$ monovalent organic radical. For example, R may be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{10}$ aryl group, $C_6$-$C_{10}$ aryloxy group, $C_7$-$C_{13}$ aralkyl group, $C_7$-$C_{13}$ aralkoxy group, $C_7$-$C_{13}$ alkaryl group, or $C_7$-$C_{13}$ alkaryloxy group. Combinations of the foregoing R groups may be used in the same copolymer. Generally, D may have an average value of 2 to about 1000, specifically 2 to about 500, more specifically about 30 to about 100, or from about 35 to about 55, or alternatively from 2 to about 20 or 5 to about 15. Where D is of a lower value, e.g., less than about 40, it may be desirable to use a relatively larger amount of the polycarbonate-polysiloxane copolymer. Conversely, where D is of a higher value, e.g., greater than about 40, it may be necessary to use a relatively lower amount of the polycarbonate-polysiloxane copolymer. D may be referred to as the siloxane block chain length.

In some embodiments, the polydiorganosiloxane blocks are provided by repeating structural units of formula (10):

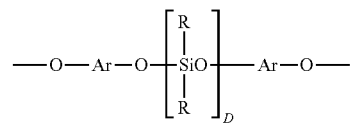

(10)

wherein D is as defined above; each R may be the same or different, and is as defined above; and Ar may be the same or different, and is a substituted or unsubstituted $C_6$-$C_{30}$ arylene radical, wherein the bonds are directly connected to an aromatic moiety. Suitable Ar groups in formula (8) may be derived from a $C_6$-$C_{30}$ dihydroxyarylene compound, for example a dihydroxyarylene compound of formula (3), (4), or (6) above. Combinations comprising at least one of the foregoing dihydroxyarylene compounds may also be used.

Such units may be derived from the corresponding dihydroxy compound of the following formula (11):

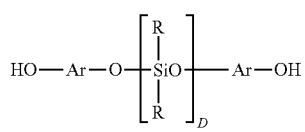
(11)

wherein Ar and D are as described above. Compounds of this formula may be obtained by the reaction of a dihydroxyarylene compound with, for example, an alpha, omega-bisacetoxypolydiorangonosiloxane under phase transfer conditions.

In another embodiment the polydiorganosiloxane blocks comprise repeating structural units of formula (12):

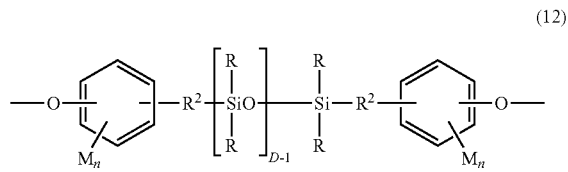
(12)

wherein R and D are as defined above. $R^2$ in formula (12) is a divalent $C_2$-$C_8$ aliphatic group. Each M in formula (12) may be the same or different, and may be cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, wherein each n is independently 0, 1, 2, 3, or 4.

In some embodiments, M is an alkyl group such as methyl, ethyl, or propyl, an alkoxy group such as methoxy, ethoxy, or propoxy, or an aryl group such as phenyl, or tolyl; $R^2$ is a dimethylene, trimethylene, or tetramethylene group; and R is a $C_{1-8}$ alkyl, haloalkyl such as trifluoropropyl, cyanoalkyl, or aryl such as phenyl or tolyl. In another embodiment, R is methyl, or a mixture of methyl and phenyl. In still another embodiment, M is methoxy, n is one, $R^2$ is a divalent $C_1$-$C_3$ aliphatic group, and R is methyl.

These units may be derived from the corresponding dihydroxy polydiorganosiloxane (13):

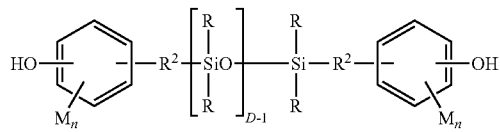
(13)

wherein R, D, M, $R^2$, and n are as described above.

Such dihydroxy polysiloxanes may be made by effecting a platinum catalyzed addition between a siloxane hydride of the formula (14),

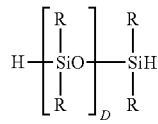
(14)

wherein R and D are as previously defined, and an aliphatically unsaturated monohydric phenol. Suitable aliphatically unsaturated monohydric phenols included, for example, eugenol, 2-allylphenol, 4-allylphenol, 4-allyl-2-methylphenol, 4-allyl-2-phenylphenol, 4-allyl-2-t-butoxyphenol, 4-phenyl-2-phenylphenol, 2-methyl-4-propylphenol, 2-allyl-4,6-dimethylphenol, 2-allyl-6-methoxy-4-methylphenol and 2-allyl-4,6-dimethylphenol. Mixtures comprising at least one of the foregoing may also be used.

In specific embodiments, where Ar of formula (8) is derived from resorcinol, the polydiorganosiloxane repeating units are derived from polysiloxane bisphenols of formula (15):

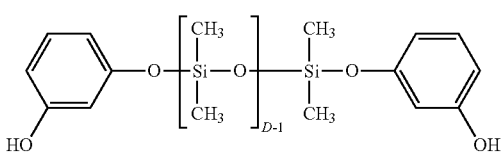
(15)

or, where Ar is derived from bisphenol A, from polysiloxane bisphenols of formula (16):

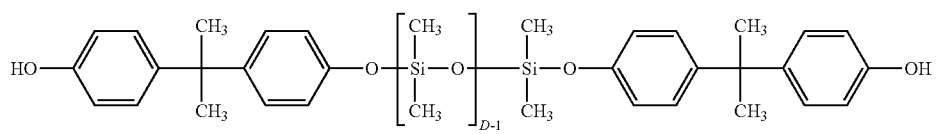
(16)

wherein D is as defined above.

In other specific embodiments, the polysiloxane units are derived from a polysiloxane bisphenol of formula (17):

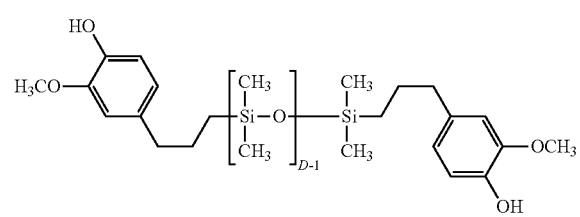
(17)

wherein D is as described in formula (7).

In yet other specific embodiments, the polysiloxane units are derived from polysiloxane bisphenol of formula (18) or (19):

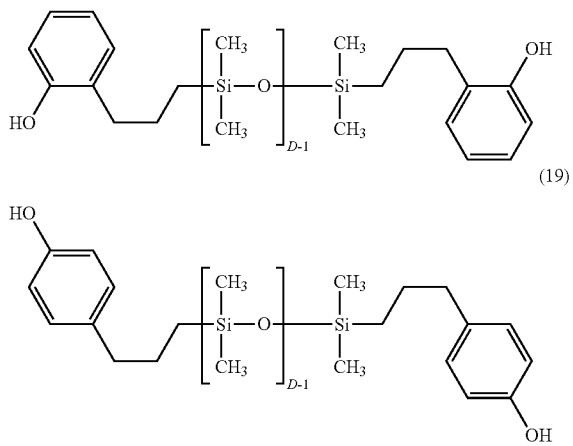

wherein D is as described in formula (7).

The siloxane blocks may make up from greater than zero to about 25 wt % of the polysiloxane-polycarbonate copolymer, including from about 4 wt % to about 25 wt %, from about 4 wt % to about 10 wt %, or from about 15 wt % to about 25 wt %. The polycarbonate blocks may make up from about 75 wt % to less than about 100 wt % of the block copolymer, including from about 75 wt % to about 85 wt %. It is specifically contemplated that the polysiloxane-polycarbonate copolymer is a diblock copolymer. The polysiloxane-polycarbonate copolymer may have a weight average molecular weight of from about 28,000 to about 32,000 Da. The polycarbonate compositions may include from about 5 to about 70 wt % of the polysiloxane-polycarbonate copolymer, including from about 5 wt % to about 20 wt % or from about 15 wt % to about 65 wt %. In particular embodiments, the composition comprises from about 0.5 wt % to about 6 wt % of siloxane originating from the polysiloxane-polycarbonate copolymer. The amount (by weight) of polysiloxane-polycarbonate copolymer may sometimes be less than the amount of poly(aliphatic ester)-polycarbonate copolymer (A), usually by at least about 10 wt % or by at least 20 wt % of the composition. Alternatively, the amount of polysiloxane-polycarbonate copolymer may be defined by the total siloxane block content that it contributes to the overall polycarbonate composition. In embodiments, the composition may have a siloxane block content of from about 0.5 wt % to about 5 wt % based on the total weight of the composition, including from about 0.9 wt % to about 4.0 wt %, or from about 2.0 wt % to about 3.0 wt %. Exemplary commercially available polysiloxane-polycarbonate copolymers are sold under the mark LEXAN® EXL by SABIC IP B. V.

The poly(aliphatic ester)-polycarbonate copolymer (A) may contain additional monomers if desired. Similarly, the polysiloxane-polycarbonate copolymer (B) may contain additional monomers if desired. These polycarbonate copolymers may be manufactured by processes known in the art, such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., about 8 to about 10. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue.

The polycarbonate compositions also comprise an electromagnetic shielding agent (C). Generally, the electromagnetic shielding agent is a metal fiber. The metal fiber used in the electromagnetic shielding agent may be any conductive metal fiber. Suitable metals include iron, copper, aluminum, nickel, titanium, and alloys of the foregoing metals. Combinations of the foregoing metals are also contemplated. In some embodiments, the electromagnetic shielding agent is stainless steel fiber. Stainless steel fibers include those comprising alloys of iron with chromium, nickel, carbon, manganese, molybdenum, mixtures comprising at least one of the foregoing, and the like. Suitable stainless steel compositions may also be designated according to commonly used grades such as stainless steel 316, stainless steel 347, and the like. All of the above materials are commercially available. For example, stainless steel fibers are commercially available from Bekaert under the tradename BEKI-SHIELD.

The length of the metal fiber may be, in some embodiments, from about 1 to about 30 millimeters prior to molding. The length of the metal fiber may be, in other embodiments, at least about 3 millimeters prior to molding. The length of the metal fiber may be, in yet other embodiments, at least 5 millimeters prior to molding. The length of the metal fiber may be, in still other embodiments, at least about 10 millimeters prior to molding. The length of the metal fiber may be, in yet additional embodiments, up to about 20 millimeters prior to molding. The length of the metal fiber may be, in still other embodiments, up to about 15 millimeters prior to molding. After molding, the length of the metal fiber may be less than specified above. For example, in some embodiments, the length of the metal fiber after molding may be about 30 micrometers to about 3 millimeters.

The diameter of the metal fiber may be from about 3 to about 20 micrometers, both before and after molding. The diameter of the metal fiber may be, in other embodiments, at least about 8 micrometers. The diameter of the metal fiber may be, in yet other embodiments, up to about 15 micrometers. The diameter of the metal fiber may be, in still other embodiments, up to about 12 micrometers. The diameter of the metal fiber may be, in yet other embodiments, up to about 10 micrometers.

In alternative embodiments, the electromagnetic shielding agent includes a metal-coated fiber. Suitable core materials for the metal-coated fiber may include vitreous mineral such as glass, silicates of aluminum, silicates of magnesium, silicates of calcium, and the like; and inorganic carbon materials such as graphite, carbon powders, carbon fibers, mica, and the like. Any metals capable of enhancing the shield effectiveness of thermoplastic resins may be used as the metal coating of the metal-coated fiber. Suitable metals include silver, gold, copper, aluminum, nickel, platinum, alloys including at least one of the foregoing metals, combinations including at least one of the foregoing metals, and the like. In some embodiments, the metal-coated fiber is a silver-coated vitreous mineral fiber. The metal-coated fibers may have the same dimensions as described for the metal fibers.

The metal content of the metal-coated fiber may be from about 1 to about 30 weight percent, based on the total weight of the metal-coated fiber. In alternative embodiments, the metal-coated fiber may use at least about 10 weight percent of the metal. In other embodiments, the metal-coated fiber may use up to about 20 weight percent of the metal. In yet other embodiments, the metal-coated fiber may use up to about 15 weight percent of the metal.

The length of the metal-coated fiber before and after extrusion and/or molding of the composition may be, in some embodiments, from about 25 to 600 micrometers. The length of the metal-coated fiber before and after extrusion and/or molding of the composition may be, in other embodiments, at least 50 micrometers. The length of the metal-coated fiber before and after extrusion and/or molding of the composition may be, in yet other embodiments, at least about 150 micrometers. The length of the metal-coated fiber before and after extrusion and/or molding of the composition may be, in still other embodiments, up to 500 micrometers. The length of the metal-coated fiber before and after extrusion and/or molding of the composition may be, in yet other embodiments, up to about 300 micrometers. The length of the metal-coated fiber before and after extrusion and/or molding of the composition may be, in still other embodiments, up to about 300 micrometers.

The diameter of the metal-coated fiber may be, in some embodiments, from about 1 to about 10 micrometers. The diameter of the metal-coated fiber may be, in other embodiments, at least about 3 micrometers. The diameter of the metal-coated fiber may be, in yet other embodiments, at least 5 micrometers. The diameter of the metal-coated fiber may be, in still other embodiments, up to about 8 micrometers. The diameter of the metal-coated fiber may be, in yet other embodiments, up to 6 micrometers.

The electromagnetic shielding agent may be present in the composition in an amount of from about 5 to about 20 weight percent, based on the total weight of the composition. The electromagnetic shielding agent may be, in other embodiments, present in the composition in an amount of at least about 3 weight percent, based on the total weight of the composition. The electromagnetic shielding agent may be, in yet other embodiments, present in the composition in an amount of up to about 20 weight percent, based on the total weight of the composition. The electromagnetic shielding agent may be, in still another embodiment, present in the composition in an amount of from about 5 to about 15 weight percent, based on the total weight of the composition.

In some embodiments, the electromagnetic shielding agent is substantially free of a metal powder and a metal flake. The term "substantially free" is herein defined, as limiting the amount of the powder or flake to less than about 0.1 weight percent, based on the total weight of the composition. In other embodiments, the powder or flake is present at less than about 0.01 weight percent. In other embodiments, the powder or flake is not intentionally added to the electromagnetic shielding agent in any amount.

In other embodiments, the composition contains an electromagnetic shielding agent including from 0.5 to about 10 weight percent of metal powder and/or metal flake, based on the total weight of the composition. Suitable metal powders and flakes may include iron, silver, aluminum, nickel, copper, alloys comprising at least one of the foregoing metals, mixtures including at least one of the foregoing metals, and the like. Fibers, powders, and flakes may be distinguished from each other on the basis of their aspect ratios. Fibers may be defined has having a number average aspect ratio greater than about 3, where the aspect ratio is defined as the ratio of the length to the equivalent circular diameter. In contrast, flakes may be defined as having a number average aspect ratio less than 0.25, and powders may be defined as having a number average aspect ratio of 0.25 to about 3.

The polycarbonate composition may, in some embodiments, further comprise an impact modifier (D). The impact modifier may include an elastomer-modified graft copolymer comprising (i) an elastomeric (i.e., rubbery) polymer substrate having a glass transition temperature (Tg) less than about 10° C., more specifically less than about −10° C., or more specifically about −40° C. to −80° C., and (ii) a rigid polymeric superstrate grafted to the elastomeric polymer substrate. As is known, elastomer-modified graft copolymers may be prepared by first providing the elastomeric polymer, then polymerizing the constituent monomer(s) of the rigid phase in the presence of the elastomer to obtain the graft copolymer. The grafts may be attached as graft branches or as shells to an elastomer core. The shell may merely physically encapsulate the core, or the shell may be partially or essentially completely grafted to the core.

Suitable materials for use as the elastomer phase include, for example, conjugated diene rubbers; copolymers of a conjugated diene with less than about 50 wt % of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl (meth)acrylates; elastomeric copolymers of $C_{1-8}$ alkyl (meth)acrylates with butadiene and/or styrene; or combinations comprising at least one of the foregoing elastomers. As used herein, the terminology "(meth)acrylate monomers" refers collectively to acrylate monomers and methacrylate monomers.

A specific impact modifier of this type is a methyl methacrylate-butadiene-styrene (MBS) impact modifier wherein the butadiene substrate is prepared using above-described sulfonates, sulfates, or phosphates as surfactants. Other exemplary elastomer-modified graft copolymers include acrylonitrile-butadiene-styrene (ABS), acrylonitrile-styrene-butyl acrylate (ASA), methyl methacrylate-acrylonitrile-butadiene-styrene (MABS), and acrylonitrile-ethylene-propylene-diene-styrene (AES).

In some embodiments, the impact modifier is a graft polymer having a high rubber content, i.e., greater than or equal to about 50 wt %, optionally greater than or equal to about 60 wt % by weight of the graft polymer. The rubber is desirably present in an amount less than or equal to about 95 wt %, optionally less than or equal to about 90 wt % of the graft polymer.

A mixture of grafting monomers may also be used, to provide a graft copolymer. An example of a suitable mixture comprises a monovinylaromatic hydrocarbon and an acrylic monomer. Examples of graft copolymers suitable for use include, but are not limited to, acrylonitrile-butadiene-styrene (ABS) and methacrylonitrile-butadiene-styrene (MBS) resins. Suitable high-rubber acrylonitrile-butadiene-styrene resins are available from SABIC (formerly General Electric Company) as BLENDEX® grades 131, 336, 338, 360, and 415.

In some embodiments, the polycarbonate composition comprises from about 20 wt % to about 85 wt % of the poly(aliphatic ester)-polycarbonate copolymer (A); from about 5 wt % to about 70 wt % of the polysiloxane-polycarbonate copolymer (B); and from about 5 wt % to about 20 wt % of the electromagnetic shielding agent (C). When present, the impact modifier (D) may be present in the amount of from about 2 wt % to about 8 wt %. These values are based on the total weight of the composition. It should be noted that the at least one poly(aliphatic ester)-polycarbonate copolymer (A) may be a blend of two or more polycarbonate copolymers having different weight average molecular weights, and the recited about 20 wt % to about 85 wt % refers to the total amount of such polycarbonate copolymers (A) in the composition.

In additional embodiments, the polycarbonate composition comprises from about 10 wt % to about 55 wt % of the poly(aliphatic ester)-polycarbonate copolymer (A1) having a Mw of from about 15,000 to about 25,000 Da; from about 5 wt % to about 40 wt % of the poly(aliphatic ester)-polycarbonate copolymer (A2) having a Mw of from about 30,000 to about 40,000 Da; from about 5 wt % to about 70 wt % of the polysiloxane-polycarbonate copolymer (B); and from about 5 wt % to about 20 wt % of the electromagnetic shielding agent (C).

The polycarbonate compositions have a combination of good impact strength, high gloss, and effective electromagnetic shielding. They have, at a minimum, a notched Izod impact strength measured according to ASTM D 256 of at least about 110 J/m; and a gloss measured according to ASTM D2457 (at 20°) of at least about 90.

The polycarbonate compositions may exhibit a notched Izod impact strength (NII) measured according to ASTM D256 of at least about 110 J/m, when measured at 23° C., 5 lbf, and 3.2 mm thickness. In some embodiments, the notched Izod impact strength of the composition is at least about 130 J/m, including at least about 150 J/m. The notched Izod impact strength may reach a maximum of about 200 J/m.

The polycarbonate compositions may exhibit a gloss measured according to ASTM D2457 (at 20°) of at least about 90, including at least about 92. The gloss may reach a maximum of about 97. In some embodiments, the gloss has the values described above when measured at 20° and has a gloss of at least about 98 when measured at 60°. In this regard, a higher gloss value indicates a smoother surface, and the 20° angle is more sensitive to surface roughness than the 60° measurement.

The polycarbonate compositions may have a flexural modulus of at least 2000 megaPascal (MPa) when measured according to ISO 178, including at least 2300 MPa or at least 2400 MPa. The flexural modulus has reached a maximum of 2600 MPa.

The polycarbonate compositions may have, in some embodiments, a shielding effectiveness of at least about 30 decibels measured according to the American Society for Testing and Materials' (ASTM) standard test method for measuring the electromagnetic shielding effectiveness of planar materials (D4935). In other embodiments, the compositions have a shielding effectiveness of at least about 30 decibels. In yet another embodiment, the compositions have a shielding effectiveness of at least 50 decibels.

The polycarbonate compositions may have any combination of these properties (NII, gloss, flexural modulus, shielding effectiveness), and any combination of the listed values for these properties. It should be noted that some of the properties (e.g., NII) are measured using articles made from the polycarbonate composition; however, such properties are described as belonging to the polycarbonate composition for ease of reference.

In some embodiments, the composition exhibits a notched Izod impact strength measured according to ASTM D 256 of at least about 110 J/m; a gloss measured according to ASTM D2457 (at 20°) of at least about 90; and a shielding effectiveness measured according to ASTM D4935 of at least about 30 decibels.

In some embodiments, the composition exhibits a notched Izod impact strength measured according to ASTM D 256 of at least about 110 J/m; a gloss measured according to ASTM D2457 (at 20°) of at least about 90; and a flexural modulus measured according to ISO 178 of at least about 2000 MPa.

In some embodiments, the composition exhibits a notched Izod impact strength measured according to ASTM D 256 of at least about 130 J/m; and a gloss measured according to ASTM D2457 (at 20°) of at least about 90, In some embodiments, the composition exhibits a notched Izod impact strength measured according to ASTM D 256 of at least about 110 J/m; and a gloss measured according to ASTM D2457 (at 20°) of at least about 92.

In some embodiments, the composition exhibits a notched Izod impact strength measured according to ASTM D 256 of at least about 140 J/m; a gloss measured according to ASTM D2457 (at 20°) of at least about 92; and a shielding effectiveness measured according to ASTM D4935 of at least about 30 decibels.

In some embodiments, the composition exhibits a notched Izod impact strength measured according to ASTM D 256 of at least about 110 J/m; a gloss measured according to ASTM D2457 (at 20°) of at least about 90; and a gloss measured according to ASTM D2457 (at 26°) of at least about 98.

In some embodiments, the composition exhibits a notched Izod impact strength measured according to ASTM D 256 of at least about 110 J/m; a gloss measured according to ASTM D2457 (at 20°) of at least about 90.

Other additives ordinarily incorporated in polycarbonate compositions of this type may also be used, with the proviso that the additives are selected so as to not significantly adversely affect the desired properties of the polycarbonate. Combinations of additives may be used. Such additives may be mixed at a suitable time during the mixing of the components for forming the composition. In embodiments, one or more additives are selected from at least one of the following: UV stabilizing additives, thermal stabilizing additives, mold release agents, colorants, and gamma-stabilizing agents.

Exemplary antioxidant additives include, for example, organophosphites such as tris(nonyl phenyl)phosphite, tris(2, 4-di-t-butylphenyl)phosphite (e.g., "IRGAFOS 168" or "1-168"), bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene (3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate or the like; amides of beta-(3,5-di-tert-butyl-4-hydroxyphenyl)-propionic acid or the like, or combinations comprising at least one of the foregoing antioxidants. Antioxidants are generally used in amounts of 0.0001 to about 1 wt % of the overall polycarbonate composition.

Exemplary heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of 0.0001 to about 1 wt % of the overall polycarbonate composition.

Light stabilizers and/or ultraviolet light (UV) absorbing additives may also be used. Exemplary light stabilizer additives include, for example, benzotriazoles such as 2-(2-hydroxy-5-methyl phenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers are generally used in amounts of 0.0001 to about 1 wt % of the overall polycarbonate composition.

Exemplary UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1,3,5-triazin-2-yl]-5-(octyloxy)-phenol (CYASORB® about 1164); 2,2'-(1,4-phenylene)bis(4H-3,1-benzoxazin-4-one) (CYASORB® UV-3638); 1,3-bis[(2-cyano-3,3-diphenylacryloyl)oxy]-2,2-bis[[(2-cyano-3,3-diphenylacryloyl)oxy]methyl]propane (UVINUL® 3030); 2,2'-(1,4-phenylene) bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than or equal to about 100 nanometers; or the like, or combinations comprising at least one of the foregoing UV absorbers. UV absorbers are generally used in amounts of 0.0001 to about 1 wt % of the overall polycarbonate composition.

Plasticizers, lubricants, and/or mold release agents may also be used. There is considerable overlap among these types of materials, which include, for example, phthalic acid esters such as dioctyl-4,5-epoxy-hexahydrophthalate; tris-(octoxy-carbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate (PETS), and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like. Such materials are generally used in amounts of 0.001 to about 1 wt %, specifically 0.01 to 0.75 wt %, more specifically 0.1 to 0.5 wt % of the overall polycarbonate composition.

Besides the titanium dioxide (D), other colorants such as pigment and/or dye additives may also be present in order to offset any color that may be present in the polycarbonate resin and to provide desired color to the customer. Useful pigments may include, for example, inorganic pigments such as metal oxides and mixed metal oxides such as zinc oxide, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red about 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments are generally used in amounts of about 0.01 to about 10 wt % of the overall polycarbonate composition.

Exemplary dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly (C2-8) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. Dyes are generally used in amounts of 0.01 to about 10 wt % of the overall polycarbonate composition.

Radiation stabilizers may also be present, specifically gamma-radiation stabilizers. Exemplary gamma-radiation stabilizers include alkylene polyols such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; cycloalkylene polyols such as 1,2-cyclopentanediol, 1,2-cyclohexanediol, and the like; branched alkylenepolyols such as 2,3-dimethyl-2,3-butanediol (pinacol), and the like, as well as alkoxy-substituted cyclic or acyclic alkanes. Unsaturated alkenols are also useful, examples of which include 4-methyl-4-penten-2-ol, 3-methyl-pentene-3-ol, 2-methyl-4-penten-2-ol, 2,4-dimethyl-4-pene-2-ol, and 9-decen-1-ol, as well as tertiary alcohols that have at least one hydroxy substituted tertiary carbon, for example 2-methyl-2,4-pentanediol (hexylene glycol), 2-phenyl-2-butanol, 3-hydroxy-3-methyl-2-butanone, 2-phenyl-2-butanol, and the like, and cyclic tertiary alcohols such as 1-hydroxy-1-methyl-cyclohexane. Certain hydroxymethyl aromatic compounds that have hydroxy substitution on a saturated carbon attached to an unsaturated carbon in an aromatic ring may also be used. The hydroxy-substituted saturated carbon may be a methylol group (—CH$_2$OH) or it may be a member of a more complex hydrocarbon group such as —CR$^4$HOH or —CR$^4$OH wherein R$^4$ is a complex or a simple hydrocarbon. Specific hydroxy methyl aromatic compounds include benzhydrol, 1,3-benzenedimethanol, benzyl alcohol, 4-benzyloxy benzyl alcohol and benzyl benzyl alcohol. 2-Methyl-2,4-pentanediol, polyethylene glycol, and polypropylene glycol are often used for gamma-radiation stabilization. Gamma-radiation stabilizing compounds are typically used in amounts of 0.1 to about 10 wt % of the overall polycarbonate composition.

The polycarbonate compositions may be molded into pellets. The compositions may be molded, foamed, or extruded into various structures or articles by known methods, such as injection molding, overmolding, extrusion, rotational molding, blow molding, and thermoforming. In particular, articles that benefit from EMI shielding are contemplated, such as electronic equipment, electronic housings, or electronic components. Non-limiting examples include computer housings, cell phone components, hand held electronic devices such as MP3 players, electronic tablets, pagers, camera housings, video recorders, video games, calculators, wireless car entry devices, automotive parts, filter housings, luggage carts, and office chairs, kitchen appliances, electrical housings, etc., e.g., a smart meter housing, and the like; electrical connectors, and components of lighting fixtures, ornaments, home appliances, Light Emitting Diodes (LEDs) and light panels, extruded film and sheet articles; electrical parts, such as relays; and telecommunications parts such as parts for base station terminals. The present disclosure further contemplates additional fabrication operations on said articles, such as, but not limited to, molding, in-mold decoration, baking in a paint oven, lamination, and/or thermoforming. The polycarbonate compositions are especially useful for making articles that have parts with a thickness of at least 0.3 mm and less than 0.8 mm.

The present disclosure separately relates to a second set of polycarbonate compositions which exhibit improved impact properties. These polycarbonate compositions comprise (A) at least one poly(aliphatic ester)-polycarbonate copolymer, (B) a polysiloxane-polycarbonate copolymer, and (E) carbon fibers.

The structure of the at least one poly(aliphatic ester)-polycarbonate copolymer (A) has been previously described above. The structure of the polysiloxane-polycarbonate copolymer (B) has also been previously described above. Those prior descriptions apply to this second set of polycarbonate compositions as well.

In the second set of polycarbonate compositions, the poly(aliphatic ester) polycarbonate copolymer (A) may have a weight average molecular weight of from about 15,000 to about 40,000 Da, including from about 20,000 to about 38,000 Da (measured by GPC based on BPA polycarbonate standards). The second set of polycarbonate compositions may include from about 10 wt % to about 85 wt % of the poly(aliphatic ester)-polycarbonate copolymer.

Sometimes, the second set of polycarbonate compositions includes two poly(aliphatic ester)-polycarbonate copolymers, i.e., a first poly(aliphatic ester)-polycarbonate copolymer (A1) and a second poly(aliphatic ester)-polycarbonate copolymer (A2). These two copolymers (A1) and (A2) are as previously described as well with regard to molecular weight and weight ratio. The second set of compositions may include from about 10 to about 85 wt % of the first poly(aliphatic ester)-polycarbonate copolymer (i.e., the lower Mw copolymer) and the second poly(aliphatic ester)-polycarbonate copolymer (i.e., the higher Mw copolymer) combined. The composition may contain from about 5 to about 50 wt % of the first poly(aliphatic ester)-polycarbonate copolymer. The composition may contain from about 5 to about 30 wt % of the second poly(aliphatic ester)-polycarbonate copolymer.

The second set of polycarbonate compositions may include from about 5 to about 70 wt % of the polysiloxane-polycarbonate copolymer, including from about 5 wt % to about 20 wt % or from about 15 wt % to about 65 wt %. The amount (by weight) of polysiloxane-polycarbonate copolymer may sometimes be less than the amount of poly(aliphatic ester)-polycarbonate copolymer (A), usually by at least about 10 wt % or by at least 20 wt % of the composition. Alternatively, the amount of polysiloxane-polycarbonate copolymer may be defined by the total siloxane block content that it contributes to the overall polycarbonate composition. In embodiments, the second set of polycarbonate compositions may have a siloxane block content of from about 0.5 wt % to about 5 wt % based on the total weight of the composition, including from about 0.9 wt % to about 4.0 wt %, or from about 2.0 wt % to about 3.0 wt %.

Carbon fibers (E) are present in the second set of polycarbonate compositions. Carbon fibers are similar to the metal fibers previously described, but are comprised of mostly carbon or all carbon. The carbon fibers may have a length of from about 1 to about 30 millimeters prior to molding, including at least about 3 millimeters, at least about 5 millimeters, at least about 10 millimeters, up to about 20 millimeters, or up to about 15 millimeters prior to molding. After molding, the length of the metal fiber may be less than specified above. For example, in some embodiments, the length of the carbon fibers after molding may be from about 25 to about 600 micrometers, including from about 30 micrometers to about 3 millimeters, or at least about 50 micrometers, or at least about 150 micrometers, up to about 500 micrometers, up to about 400 micrometers, or up to about 300 micrometers. The diameter of the carbon fibers may be from about 4 to about 20 micrometers, both before and after molding. In other embodiments, the diameter of the carbon fibers may be from about 1 to about 10 micrometers, at least about 8 micrometers, up to about 15 micrometers, up to about 12 micrometers, or up to about 10 micrometers. Carbon fibers may be present in the amount of greater than zero to about 30 wt %, including from about 5 wt % to about 30 wt %.

In some embodiments, the second set of polycarbonate compositions comprise from about 10 wt % to about 85 wt % of the poly(aliphatic ester)-polycarbonate copolymer (A); from about 5 wt % to about 70 wt % of the polysiloxane-polycarbonate copolymer (B); and from about 5 wt % to about 30 wt % of carbon fibers (E). When present, the impact modifier (D) may be present in the amount of from about 2 wt % to about 8 wt %. These values are based on the total weight of the composition. It should be noted that the at least one poly(aliphatic ester)-polycarbonate copolymer (A) may be a blend of two or more polycarbonate copolymers having different weight average molecular weights, and the recited about 10 wt % to about 85 wt % refers to the total amount of such polycarbonate copolymers (A) in the composition.

In additional embodiments, the second set of polycarbonate compositions comprise from about 5 wt % to about 50 wt % of the poly(aliphatic ester)-polycarbonate copolymer (A1) having a Mw of from about 15,000 to about 25,000 Da; from about 5 wt % to about 30 wt % of the poly(aliphatic ester)-polycarbonate copolymer (A2) having a Mw of from about 30,000 to about 40,000 Da; from about 5 wt % to about 70 wt % of the polysiloxane-polycarbonate copolymer (B); and from about 5 wt % to about 20 wt % of the carbon fibers (E).

The second set of polycarbonate compositions have improved impact strength. They have, at a minimum, a notched Izod impact strength (NII) measured according to ISO 180 (23° C., 3 mm) of at least about 9.5 kJ/m$^2$; and a multiaxial impact strength (MAI) measured according to ASTM D3763 (23° C.) of at least about 13 J.

In more particular embodiments, the NII of the second set of polycarbonate compositions measured according to ISO 180 (23° C., 3 mm) is at least about 11 kJ/m$^2$.

In other particular embodiments, the MAI of the second set of polycarbonate compositions measured according to ISO 6603 (23° C.) is at least about 14 J, or at least about 15 J, or at least about 16 J.

The second set of polycarbonate compositions may exhibit a gloss measured according to ASTM D2457 (at 20°) of at least 7, including at least about 10 and at least about 15. The gloss may reach a maximum of about 30.

The second set of polycarbonate compositions may have a flexural modulus of at least 850 MPa when measured according to ISO 178, including at least about 9000 MPa or at least about 10,000 MPa. The flexural modulus have reached a maximum of about 15,000 MPa.

Again, the second set of polycarbonate compositions may have any combination of these properties (NII, MAI, gloss, flexural modulus), and any combination of the listed values for these properties. It should be noted that some of the properties (e.g., NII) are measured using articles made from the polycarbonate composition; however, such properties are described as belonging to the polycarbonate composition for ease of reference.

In some specific embodiments, the second set of compositions exhibits a notched Izod impact strength measured according to ISO 180 (23° C., 3 mm) of at least about 9.5 kJ/m$^2$; a multiaxial impact strength (MAI) measured according to ASTM D3763 (23° C.) of at least about 13 J; a flexural modulus of at least about 9000 MPa; and a gloss measured according to ASTM D2457 (at 20°) of at least about 10.

In other specific embodiments, the second set of compositions exhibits a notched Izod impact strength measured according to ISO 180 (23° C., 3 mm) of at least about 9.5 kJ/m$^2$; a multiaxial impact strength (MAI) measured according to ASTM D3763 (23° C.) of at least about 13 J; a flexural modulus of at least about 10,000 MPa; and a gloss measured according to ASTM D2457 (at 20°) of at least about 15.

The addition of filler usually decreases the impact strength of polycarbonate compositions, particularly the NII and the MAI. Thus, it was unexpected that the combination of a high flow polycarbonate, a polysiloxane-polycarbonate copolymer, and carbon fibers would exhibit higher impact strength.

The following examples are provided to illustrate the polycarbonate compositions, articles, and methods of the present disclosure. The examples are merely illustrative and are not intended to limit the disclosure to the materials, conditions, or process parameters set forth therein.

EXAMPLES

Table 1 lists the names and descriptions of the ingredients used in the following Examples.

TABLE 1

| Ingredient | Description | Mw (Da) | Trade name | Supplier |
|---|---|---|---|---|
| PAEBPA$_{low}$ | Sebacic acid-bisphenol A copolymer, 6.0 mol % sebacic acid, PCP (p-cumylphenol) endcapped | 21,400 | LEXAN | SABIC |
| PAEBPA$_{high}$ | Sebacic acid-bisphenol A copolymer, 8.5 mol % sebacic acid, PCP (p-cumylphenol) endcapped | 36,500 | LEXAN | SABIC |
| PC$_{low}$ | Bisphenol A homopolymer, PCP (p-cumylphenol) endcapped | 21,700 | LEXAN | SABIC |
| PC$_{high}$ | Bisphenol A homopolymer, PCP (p-cumylphenol) endcapped | 29,600 | LEXAN | SABIC |
| PC-Si-1 | BPA polycarbonate-polydimethylsiloxane copolymer comprising about 20% by weight of siloxane, 80% by weight of BPA, PCP (p-cumylphenol) endcapped, siloxane chain length is ~35-55 | 30,000 | LEXAN | SABIC |
| PC-Si-2 | BPA polycarbonate-polydimethylsiloxane copolymer comprising about 6% by weight of siloxane, 94% by weight of BPA, PCP (p-cumylphenol) endcapped, siloxane chain length is ~35-55 | 21,000 | LEXAN | SABIC |
| SSF | Stainless Steel Fibers, 75% masterbatch | NA | GR77/S3010/E-5 | Bekaert Fiber Technology |
| PETS | Pentaerythritol tetrastearate, >90% esterified, mold release agent | N/A | N/A | Asia Pacific PTE Ltd. |
| ADR 4368 | Chain extender | ~6,800 | JONCRYL | BASF |
| Phosphites | Stabilizers | N/A | Alkanox | CIBA |
| Carbon Fiber | PAN Carbon fibers | NA | SGLC30 S006 PUT | SGL Carbon |
| Black Conc. | 70% Carbon Black in Polyolefin carrier. | NA | PVB 1246 | Hubron Int. LTD. |

The compositions described below were compounded and molded using the conditions listed in Tables 2 and 3. The polycarbonate powders were pre-blended with the other ingredients except for the Stainless Steel fibers. The pre-blended powders were extruded using a twin-screw extruder. The Stainless Steel fibers were fed downstream in a separate feeder during extrusion. The compounding conditions are listed in Table 2. The molding conditions are listed in Table 3.

TABLE 2

| Setting | Unit | Value |
|---|---|---|
| Barrel size | mm | 1500 |
| Die | mm | 430 |
| Zone 1 Temp | ° C. | 50 |
| Zone 2 Temp | ° C. | 100 |
| Barrel Temp | ° C. | 280 |
| Die Temp | ° C. | 280 |
| Screw speed | rpm | 400 |
| Throughput | Kg/hr | 40 |
| Torque | % | 47 |
| Vacuum 1 | MPa | 0.8 |

TABLE 3

| Step | Unit | Value |
|---|---|---|
| Pre-drying time | Hour | 3 |
| Pre-drying temp | ° C. | 120 |
| Hopper temp | ° C. | 50 |
| Zone 1 temp | ° C. | 275 |
| Zone 2 temp | ° C. | 290 |
| Zone 3 temp | ° C. | 300 |
| Nozzle temp | ° C. | 300 |
| Mold temp | ° C. | 100 |
| Screw speed | rpm | 80 |
| Back pressure | kgf/cm$^2$ | 70 |
| Injection speed | mm/s | 20 |
| Holding pressure | kgf/cm$^2$ | 1800 |
| Transfer pressure | kgf/cm$^2$ | 2000 |

The notched Izod impact strength (NII) was measured using ASTM D256, 5 lbf, 23° C., and 3.2 mm thickness. The NII was also measured using ISO 180, 23° C., 3 mm thickness. The unnotched Izod test (UNI) was measured using ISO 180, 23° C., 3 mm thickness.

The flexural modulus and flexural strength were measured according to ISO 178 at room temperature.

The multi-axial impact (MAI) was measured according to ISO 6603 at 4.4 m/s.

The chord modulus was measured according to ISO 527 at room temperature, 50 mm/min. The stress and strain values were measured according to ISO 527 at room temperature, 50 mm/min.

The gloss was measured according to ASTM D2457 at 20° and 60°.

The shielding effectiveness was measured using the Eddy-current method. The results are reported in decibels (dB).

The heat deflection temperature (HDT) was determined according to ISO 75 at 1.8 MPa.

Examples E1-E8

The ingredients for four Comparative Examples C1-C4 and eight Examples E1-E8 are listed in Tables 4A and 4B below. Sums may not add up to 100 wt % due to rounding.

TABLE 4A

| Ingredient | Unit | C1 | C2 | C3 | C4 | E1 | E2 | E3 | E4 |
|---|---|---|---|---|---|---|---|---|---|
| PAEBPA$_{low}$ | wt % | | | | | 52.55 | 43.55 | 31.55 | 22.55 | 13.55 |
| PAEBPA$_{high}$ | wt % | | | | | 35.03 | 29.03 | 21.03 | 15.03 | 9.03 |
| PC$_{low}$ | wt % | | 52.55 | 46.55 | | | | | |
| PC$_{high}$ | wt % | | 35.03 | 31.03 | | | | | |
| PC-Si-1 | wt % | | 0 | 10 | | | | | |
| PC-Si-2 | wt % | 88 | | | | 15 | 35 | 50 | 65 |
| ADR 4368 | wt % | | 0.08 | 0.08 | 0.08 | 0.08 | 0.08 | 0.08 | 0.08 |
| Phosphites | wt % | | 0.08 | 0.08 | 0.08 | 0.08 | 0.08 | 0.08 | 0.08 |
| PTFE | wt % | | 0.25 | 0.25 | 0.25 | 0.25 | 0.25 | 0.25 | 0.25 |
| SSF | wt % | 10 | 10 | 10 | 10 | 10 | 10 | 10 | 10 |
| Black Conc. | wt % | 2 | 2 | 2 | 2 | 2 | 2 | 2 | 2 |
| Si % | | 5.28 | 0 | 2 | 0 | 0.9 | 2.1 | 3 | 3.9 |
| PAEBPA$_{low}$/PAEBPA$_{high}$ | | | | | 1.5 | 1.5 | 1.5 | 1.5 | 1.5 |
| Flex. Mod. | MPa | 2450 | 2565 | 2412 | 2642 | 2495 | 2472 | 2415 | 2387 |
| Flex. Strength | MPa | 89 | 93 | 86 | 93 | 90 | 89 | 88 | 88 |
| NII, ISO | kJ/m$^2$ | 11 | 9 | 16 | 9 | 13 | 15 | 14 | 13 |
| UNI, ISO | kJ/m$^2$ | 51 | 118 | 98 | 111 | 115 | 112 | 91 | 88 |
| NII, ASTM | J/m | 124 | 119 | 170 | 87 | 110 | 139 | 145 | 132 |
| MAI, 23° C. | J/m | 9 | 25 | 29 | 20 | 27 | 24 | 15 | 11 |
| MAI −20° C. | J/m | 10 | 5 | 8 | 2 | 4 | 4 | 10 | 11 |
| Chord Mod | MPa | 2506 | 2705 | 2575 | 2586 | 2501 | 2496 | 2454 | 2411 |
| Stress @ Yield | MPa | 56 | 59 | 56 | 59 | 57 | 56 | 55 | 54 |
| Stress @ Break | MPa | 48 | 47 | 45 | 43.96 | 43 | 44 | 45 | 46 |
| Strain @ Yield | % | 4 | 5 | 5 | 4.57 | 4 | 4 | 4 | 4 |
| Strain @ Yield | % | 5 | 10 | 8 | 4.57 | 4 | 4 | 4 | 4 |
| Gloss, 20° | | 85.3 | 85.6 | 89.6 | 84.4 | 93.5 | 93.4 | 92.2 | 93.8 |
| Gloss, 60° | | 98.7 | 99.1 | 99.6 | 98.6 | 98.8 | 99.2 | 98.9 | 96.4 |
| Shield Eff. | dB | 48 | 44 | 43 | 42 | 41 | 42 | 43 | 42 |

TABLE 4B

| Ingredient | Unit | C1 | C2 | C3 | C4 | E5 | E6 | E7 | E8 |
|---|---|---|---|---|---|---|---|---|---|
| PAEBPA$_{low}$ | wt % | | | | 52.55 | 49.55 | 46.55 | 43.55 | 40.55 |
| PAEBPA$_{high}$ | wt % | | | | 35.03 | 33.03 | 31.03 | 29.03 | 27.03 |
| PC$_{low}$ | wt % | | 52.55 | 46.55 | | | | | |
| PC$_{high}$ | wt % | | 35.03 | 31.03 | | | | | |
| PC-Si-1 | wt % | | 0 | 10 | | 5 | 10 | 15 | 20 |
| PC-Si-2 | wt % | 88 | | | | | | | |
| ADR 4368 | wt % | | 0.08 | 0.08 | 0.08 | 0.08 | 0.08 | 0.08 | 0.08 |
| Phosphites | wt % | | 0.08 | 0.08 | 0.08 | 0.08 | 0.08 | 0.08 | 0.08 |
| PTFE | wt % | | 0.25 | 0.25 | 0.25 | 0.25 | 0.25 | 0.25 | 0.25 |
| SSF | wt % | 10 | 10 | 10 | 10 | 10 | 10 | 10 | 10 |
| Black Conc. | wt % | 2 | 2 | 2 | 2 | 2 | 2 | 2 | 2 |
| Si % | | 5.28 | 0 | 2 | 0 | 1 | 2 | 3 | 4 |
| PAEBPA$_{low}$/PAEBPA$_{high}$ | | | | | 1.5 | 1.5 | 1.5 | 1.5 | 1.5 |
| Flex. Mod. | MPa | 2450 | 2565 | 2412 | 2642 | 2419 | 2380 | 2347 | 2391 |
| Flex. Strength | MPa | 89 | 93 | 86 | 93 | 86 | 84 | 82 | 81 |
| NII, ISO | kJ/m$^2$ | 11 | 9 | 16 | 9 | 16 | 17 | 18 | 18 |
| UNI, ISO | kJ/m$^2$ | 51 | 118 | 98 | 111 | 133 | 131 | 104 | 108 |
| NII, ASTM | J/m | 124 | 119 | 170 | 87 | 145 | 164 | 173 | 180 |
| MAI, 23° C. | J/m | 9 | 25 | 29 | 20 | 34 | 30 | 34 | 27 |
| MAI −20° C. | J/m | 10 | 5 | 8 | 2 | 3 | 6 | 9 | 9 |
| Chord Mod | MPa | 2506 | 2705 | 2575 | 2586 | 2483 | 2437 | 2460 | 2413 |
| Stress @ Yield | MPa | 56 | 59 | 56 | 59 | 56 | 55 | 53 | 52 |
| Stress @ Break | MPa | 48 | 47 | 45 | 43.96 | 43 | 43 | 42 | 41 |
| Strain @ Yield | % | 4 | 5 | 5 | 4.57 | 4 | 4 | 4 | 4 |
| Strain @ Yield | % | 5 | 10 | 8 | 4.57 | 4 | 4 | 4 | 4 |
| Gloss, 20° | | 85.3 | 85.6 | 89.6 | 84.4 | 95.7 | 93.4 | 92.1 | 91.6 |
| Gloss, 60° | | 98.7 | 99.1 | 99.6 | 98.6 | 99.7 | 100 | 99.2 | 98.4 |
| Shield Eff. | dB | 48 | 44 | 43 | 42 | 41 | 42 | 42 | 43 |

C1 contains PC-Si with no polycarbonate, C2 contains bisphenol-A homopolymer with no PC-Si, and C3 contains bisphenol-A homopolymer with a small quantity of PC-Si. Comparing C1 to C2, there is very little difference in both the NII and the gloss. With C3, there is a small improvement in the NII and the gloss.

In C4, poly(aliphatic ester)-polycarbonate copolymers (PAE-BPA) are used instead of bisphenol-A homopolymers and with no PC-Si. The NII is about 73% that of C2, and the gloss decreases as well.

In E1-E4, PC-Si-2 is added in varying amounts. As the amount of PC-Si-2 increases, the NII also increases. The NII improvement plateaus, as seen in E4 having a lower NII than E2 and E3. In addition, the gloss is markedly higher than the Comparative Examples. C3 and E2 may be compared because they have roughly the same siloxane content (Si %). Although the NII of E2 is lower, the gloss level at 20° is enhanced.

E5-E8 used PC-Si-1, which provides greater siloxane content for the same amount of PC-Si copolymer. Again, as the amount of PC-Si-1 increases, the NII also increases. Again, the gloss is markedly higher than the Comparative Examples.

Comparing C1-C4 against E1-E8, there is a synergy in the combination of a poly(aliphatic ester)-polycarbonate copolymer (PAE-BPA) with polysiloxane-polycarbonate (PC-Si), which provides an improved gloss at 20°. For all of the Examples, a good shielding effectiveness of >40 dB was maintained as well.

Examples E10-E17

Twelve Comparative Examples C10-C21 and eight Examples E10-E17 are described in Tables 5A-5D. They used carbon fibers, and varied in the carbon fiber content, the PC-Si type, and the PC-Si content.

TABLE 5A

| Ingredient | Unit | C10 | C11 | C12 | C13 | C14 | C15 |
|---|---|---|---|---|---|---|---|
| PAEBPA$_{low}$ | % | | 47.901 | | | | |
| PAEBPA$_{high}$ | % | | 31.934 | | | | |
| PC$_{low}$ | % | 47.901 | | 38.901 | 26.901 | 17.901 | 8.901 |
| PC$_{high}$ | % | 31.934 | | 25.934 | 17.934 | 11.934 | 5.934 |
| PC-Si-1 | % | | | | | | |
| PC-Si-2 | % | | | 15 | 35 | 50 | 65 |
| ADR 4368 | % | 0.085 | 0.085 | 0.085 | 0.085 | 0.085 | 0.085 |
| Phosphites | % | 0.08 | 0.08 | 0.08 | 0.08 | 0.08 | 0.08 |
| Carbon Fiber | % | 20 | 20 | 20 | 20 | 20 | 20 |
| Si % | % | 0 | 0 | 0.9 | 2.1 | 3 | 3.9 |
| PAEBPA$_{low}$/PAEBPA$_{high}$ | | 1.5 | 1.5 | 1.5 | 1.5 | 1.5 | 1.5 |
| Flex. Mod. | MPa | 12153 | 11818 | 11773 | 10395 | 9171 | 7978 |
| Flex. Strength | MPa | 239 | 239 | 236 | 202 | 175 | 144 |
| NII, ISO | kJ/m$^2$ | 10.6 | 11.8 | 14.3 | 15.6 | 15.9 | 15.3 |

TABLE 5A-continued

| Ingredient | Unit | C10 | C11 | C12 | C13 | C14 | C15 |
|---|---|---|---|---|---|---|---|
| UNI, ISO | kJ/m² | 45 | 42 | 45 | 36 | 36 | 34 |
| NII, ASTM | J/m | 118 | 125 | 158 | 161 | 156 | 146 |
| MAI, 23° C. | J | 10.6 | 11.4 | 14.5 | 16.8 | 15.0 | 14.5 |
| MAI, −20° C. | J | 8.5 | 9.9 | 12.3 | 13.3 | 12.8 | 12.4 |
| Chord Mod | MPa | 14669 | 14510 | 14529 | 14142 | 14006 | 13842 |
| Stress @ Break | MPa | 173 | 166 | 170 | 157 | 150 | 138 |
| Strain @ Break | % | 2.6 | 2.6 | 2.6 | 2.7 | 2.5 | 2.0 |
| HDT | ° C. | 140 | 126 | 139 | 138 | 136 | 134 |
| Gloss, 20° | | 2.9 | 11.62 | 5.2 | 6.3 | 6.2 | 8.2 |
| Gloss, 60° | | 12.5 | 34.9 | 23.3 | 25.7 | 26.5 | 31.4 |

TABLE 5B

| Ingredient | Unit | C16 | C17 | C18 | C19 |
|---|---|---|---|---|---|
| PAEBPA$_{low}$ | % | | | | |
| PAEBPA$_{high}$ | % | | | | |
| PC$_{low}$ | % | 44.901 | 41.901 | 38.901 | 35.901 |
| PC$_{high}$ | % | 29.934 | 27.934 | 25.934 | 23.934 |
| PC-Si-1 | % | 5 | 10 | 15 | 20 |
| PC-Si-2 | % | | | | |
| ADR 4368 | % | 0.085 | 0.085 | 0.085 | 0.085 |
| Phosphites | % | 0.08 | 0.08 | 0.08 | 0.08 |
| Carbon Fiber | % | 20 | 20 | 20 | 20 |
| Si % | | 1 | 2 | 3 | 4 |
| PAEBPA$_{low}$/PAEBPA$_{high}$ | | 1.5 | 1.5 | 1.5 | 1.5 |
| Flex. Mod. | MPa | 12390 | 12152 | 12059 | 11734 |
| Flex. Strength | MPa | 242 | 242 | 236 | 224 |
| NII, ISO | kJ/m² | 12.5 | 13.5 | 15.4 | 15.4 |
| UNI, ISO | kJ/m² | 42 | 45 | 44 | 42 |
| NII, ASTM | J/m | 139 | 158 | 164 | 163 |
| MAI, 23° C. | J | 11.9 | 13.6 | 15.6 | 16.8 |
| MAI, −20° C. | J | 10.1 | 11.0 | 11.9 | 13.0 |
| Chord Mod | MPa | 15319 | 14570 | 14460 | 14212 |
| Stress @ Break | MPa | 174 | 169 | 168 | 166 |
| Strain @ Break | % | 2.2 | 2.4 | 2.7 | 2.9 |
| HDT | ° C. | 140 | 140 | 133 | 133 |
| Gloss, 20° | | 6.8 | 7.4 | 7 | 7.4 |
| Gloss, 60° | | 24.6 | 26.7 | 29.4 | 29.7 |

TABLE 5D

| Ingredient | Unit | E14 | E15 | E16 | E17 |
|---|---|---|---|---|---|
| PAEBPA$_{low}$ | % | 44.901 | 41.901 | 38.901 | 35.901 |
| PAEBPA$_{high}$ | % | 29.934 | 27.934 | 25.934 | 23.934 |
| PC$_{low}$ | % | | | | |
| PC$_{high}$ | % | | | | |
| PC-Si-1 | % | 5 | 10 | 15 | 20 |
| PC-Si-2 | % | | | | |
| ADR 4368 | % | 0.085 | 0.085 | 0.085 | 0.085 |
| Phosphites | % | 0.08 | 0.08 | 0.08 | 0.08 |
| Carbon Fiber | % | 20 | 20 | 20 | 20 |
| Si % | | 1 | 2 | 3 | 4 |
| PAEBPA$_{low}$/PAEBPA$_{high}$ | | 1.5 | 1.5 | 1.5 | 1.5 |
| Flex. Mod. | MPa | 11969 | 11501 | 11690 | 11365 |
| Flex. Strength | MPa | 231 | 223 | 227 | 220 |
| NII, ISO | kJ/m² | 9.6 | 10.1 | | 11.0 |
| UNI, ISO | kJ/m² | 45 | 46 | 47 | 45 |
| NII, ASTM | J/m | | | | |
| MAI, 23° C. | J | 13.6 | 14.9 | 14.5 | 15.0 |
| MAI, −20° C. | J | 10.8 | 11.4 | 11.5 | 12.1 |
| Chord Mod | MPa | 15038 | 14160 | 14473 | 14282 |
| Stress @ Break | MPa | 165 | 157 | 161 | 161 |
| Strain @ Break | % | 2.1 | 2.4 | 2.5 | 2.7 |
| HDT | ° C. | 125 | 125 | 126 | 126 |
| Gloss, 20° | | 11.2 | 10.6 | 17.9 | 18.1 |
| Gloss, 60° | | 33.2 | 34.9 | 41.8 | 43.8 |

TABLE 5C

| Ingredient | Unit | C20 | C21 | E10 | E11 | E12 | E13 |
|---|---|---|---|---|---|---|---|
| PAEBPA$_{low}$ | | | 47.901 | 38.901 | 26.901 | 17.901 | 8.901 |
| PAEBPA$_{high}$ | | | 31.934 | 25.934 | 17.934 | 11.934 | 5.934 |
| PC$_{low}$ | | 47.901 | | | | | |
| PC$_{high}$ | | 31.934 | | | | | |
| PC-Si-1 | | | | | | | |
| PC-Si-2 | | | | 15 | 35 | 50 | 65 |
| ADR 4368 | | 0.085 | 0.085 | 0.085 | 0.085 | 0.085 | 0.085 |
| Phosphites | | 0.08 | 0.08 | 0.08 | 0.08 | 0.08 | 0.08 |
| Carbon Fiber | | 20 | 20 | 20 | 20 | 20 | 20 |
| Si % | | 0 | 0 | 0.9 | 2.1 | 3 | 3.9 |
| PAEBPA$_{low}$/PAEBPA$_{high}$ | | | 1.5 | 1.5 | 1.5 | 1.5 | 1.5 |
| Flex. Mod. | MPa | 12121 | 12008 | 11725 | 10965 | 9026 | 8502 |
| Flex. Strength | MPa | 245 | 233 | 229 | 203 | 172 | 156 |
| NII, ISO | kJ/m² | 8.0 | 8.9 | 11.0 | 11.9 | 12.4 | 11.2 |
| UNI, ISO | kJ/m² | 49 | 47 | 48 | 40 | 39 | 37 |
| NII, ASTM | J/m | | | | | | |
| MAI, 23° C. | J | 11.2 | 11.5 | 14.4 | 16.2 | 15.6 | 15.1 |
| MAI, −20° C. | J | 8.0 | 10.0 | 12.0 | 13.7 | 13.2 | 12.6 |
| Chord Mod | MPa | 14992 | 14770 | 14623 | 14570 | 14353 | 14246 |
| Stress @ Break | MPa | 175 | 166 | 162 | 158 | 150 | 138 |
| Strain @ Break | % | 2.5 | 2.7 | 2.5 | 2.7 | 2.5 | 1.9 |
| HDT | ° C. | 138 | 124 | 126 | 126 | 126 | 129 |
| Gloss, 20° | | 3.9 | 24.6 | 13.4 | 26.8 | 11.1 | 7.3 |
| Gloss, 60° | | 19.6 | 55.4 | 37.9 | 56.1 | 37.8 | 28.8 |

Referring to C10 and C11, using PAEBPA instead of polycarbonate, the NII and MAI were roughly equivalent. However, the PAEBPA had higher gloss and lower HDT.

Looking at C12-C19 compared to C10, as the amount of PC-Si increased, the NII and the MAI increased by 30-50%. Generally the flexural modulus decreased, the HDT decreased a little, and the gloss increased slightly. This also occurred in E10-E17, except for the gloss. Comparing C12-15 versus C16-C19, with the different PC-Si's, the properties were roughly equal.

Comparing Tables 5A and 5C, when PAEBPA was used instead of PC, the NII was lower, the MAI was about equal, the HDT decreased, and the gloss was significantly higher.

Comparing E10-E13 versus E14-E17, the PC-Si-1 had slightly higher gloss. As the level of PC-Si increased, the NII remained roughly level, the MAI increased slightly, and the HDT remained roughly level. For E10-E13, the gloss decreased with increasing PC-Si content, while for E14-E17 the gloss increased with increasing PC-Si content. For both PC-Si-1 and PC-Si-2, the optimum loading with respect to toughness NII and MAI) appeared to be between 2 and 3 wt % of siloxane content in the overall composition.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

What is claimed is:

1. A composition comprising:
    a first poly(aliphatic ester)-polycarbonate copolymer having a weight average molecular weight of from about 15,000 to about 40,000 Da;
    a polysiloxane-polycarbonate copolymer; and
    at least about 3 wt % of an electromagnetic shielding agent, wherein the electromagnetic shielding agent comprises at least one of metal fibers and metal-coated fibers;
    wherein the composition exhibits
    a notched Izod impact strength measured according to ASTM D256 of at least about 110 J/m; and
    a gloss measured according to ASTM D2457 (at 20°) of at least about 90.

2. The composition of claim 1, comprising from about 5 to about 20 wt % of the electromagnetic shielding agent.

3. The composition of claim 1, wherein the electromagnetic shielding agent is metal fibers.

4. The composition of claim 1, wherein the aliphatic ester is derived from an aliphatic dicarboxylic acid that has a total of from 8 to 12 carbon atoms.

5. The composition of claim 1, comprising up to about 85 wt % of the first poly(aliphatic ester)-polycarbonate copolymer.

6. The composition of claim 5, wherein the first poly(aliphatic ester)-polycarbonate copolymer contains from about 87 to about 98 mol % of carbonate units derived from bisphenol-A and the aliphatic ester units are derived from sebacic acid.

7. The composition of claim 1, further comprising a second poly(aliphatic ester)-polycarbonate copolymer; wherein a weight average molecular weight of the second poly(aliphatic ester)-polycarbonate copolymer is greater than the weight average molecular weight of the first poly(aliphatic ester)-polycarbonate copolymer.

8. The composition of claim 7, wherein the first poly(aliphatic ester)-polycarbonate copolymer has a weight average molecular weight of from about 15,000 to about 25,000 Da, and the second poly(aliphatic ester)-polycarbonate copolymer has a weight average molecular weight of from about 30,000 to about 40,000 Da.

9. The composition of claim 7, comprising from about 10 to about 55 wt % of the first poly(aliphatic ester)-polycarbonate copolymer and from about 5 to about 40 wt % of the second poly(aliphatic ester)-polycarbonate copolymer.

10. The composition of claim 7, wherein the first and the second poly(aliphatic ester)-polycarbonate copolymer contains from about 87 to about 98 mol % of carbonate units derived from bisphenol-A and the aliphatic ester units are derived from sebacic acid.

11. The composition of claim 1, comprising up to about 70 wt % of the polysiloxane-polycarbonate copolymer.

12. The composition of claim 1, wherein a siloxane block chain length of the polysiloxane-polycarbonate copolymer is from about 30 to about 100.

13. The composition of claim 1, wherein the polysiloxane-polycarbonate copolymer has a siloxane block content of from about 15 wt % to about 25 wt %.

14. The composition of claim 1, wherein the composition exhibits a flexural modulus measured according to ISO 178 of at least about 2000 MPa.

15. The composition of claim 1, wherein the composition exhibits a notched Izod impact strength measured according to ASTM D 256 of at least about 140 J/m;
    a gloss measured according to ASTM D2457 (at 20°) of at least about 92; and
    a shielding effectiveness measured according to ASTM D4935 of at least about 30 decibels.

16. The composition of claim 1, wherein the composition exhibits a gloss measured according to ASTM D2457 (at 60°) of at least about 98.

17. An article made from the composition of claim 1.

18. The article of claim 17, having a wall with a thickness of at least 0.3 mm and less than 0.8 mm, wherein the composition exhibits
    a notched Izod impact strength measured according to ASTM D 256 of at least about 110 J/m; and
    a gloss measured according to ASTM D2457 (at 20°) of at least about 90.

19. The article of claim 18, wherein the article is a component of a cellphone, an MP3 player, a computer, a laptop, a camera, a video recorder, an electronic tablet, a pager, a hand receiver, a video game, a calculator, a wireless car entry device, an automotive part, a filter housing, a luggage cart, an office chair, a kitchen appliance, an electrical housing, an electrical connector, a lighting fixture, a light emitting diode, an electrical part, or a telecommunications part.

20. A composition comprising:
    a first poly(aliphatic ester)-polycarbonate copolymer having a weight average molecular weight of from about 15,000 to about 40,000 Da;
    a polysiloxane-polycarbonate copolymer; and
    about 5 wt % to about 20 wt % carbon fibers;
    wherein the composition exhibits
    a notched Izod impact strength measured according to ISO 180 (23° C., 3 mm) of at least about 9.5 kJ/m2; and
    a multiaxial impact strength (MAI) measured according to ASTM D3763 (23° C.) of at least about 13 J.

21. The composition of claim 20, comprising up to about 85 wt % of the first poly(aliphatic ester)-polycarbonate copolymer.

22. The composition of claim 21, wherein the first poly (aliphatic ester)-polycarbonate copolymer contains from about 87 to about 98 mol % of carbonate units derived from bisphenol-A and aliphatic ester units derived from sebacic acid.

23. The composition of claim 20, further comprising a second poly(aliphatic ester)-polycarbonate copolymer, wherein a weight average molecular weight of the second poly(aliphatic ester)-polycarbonate copolymer is greater than the weight average molecular weight of the first poly(aliphatic ester)-polycarbonate copolymer.

24. The composition of claim 23, wherein the first poly (aliphatic ester)-polycarbonate copolymer has a weight average molecular weight of from about 15,000 to about 25,000 Da, and the second poly(aliphatic ester)-polycarbonate copolymer has a weight average molecular weight of from about 30,000 to about 40,000 Da.

25. The composition of claim 20, comprising up to about 70 wt % of the polysiloxane-polycarbonate copolymer.

26. The composition of claim 20, wherein a siloxane block chain length of the polysiloxane-polycarbonate copolymer is from about 30 to about 100.

27. The composition of claim 20, wherein the composition has a siloxane block content of from about 0.5 to about 5 wt %.

28. The composition of claim 20, wherein the composition exhibits
a notched Izod impact strength measured according to ISO 180 (23° C., 3 mm) of at least about 11 kJ/m2; and
a multiaxial impact strength (MAI) measured according to ASTM D3763 (23° C.) of at least about 14 J.

29. The composition of claim 20, wherein the composition exhibits a flexural modulus of at least about 9000 MPa and a gloss measured according to ASTM D2457 (at 20°) of at least about 10.

30. An article made from the composition of claim 20.

31. The article of claim 30, wherein the article has a wall with a thickness of at least 0.3 mm and less than 0.8 mm.

32. The article of claim 31, wherein the article is a part of a cellphone, an MP3 player, a computer, a laptop, a camera, a video recorder, an electronic tablet, a pager, a hand receiver, a video game, a calculator, a wireless car entry device, an automotive part, a filter housing, a luggage cart, an office chair, a kitchen appliance, an electrical housing, an electrical connector, a lighting fixture, a light emitting diode, an electrical part, or a telecommunications part.

* * * * *